(12) United States Patent
Chuang et al.

(10) Patent No.: US 7,209,212 B2
(45) Date of Patent: Apr. 24, 2007

(54) TUNABLE OPTICAL INTEGRATED ELEMENT USING LIQUID CRYSTAL AS ACTIVE LAYER

(75) Inventors: Wei-Ching Chuang, Taipei (TW); Ruey-Fang Shyu, Yun-Lin Hsien (TW); Hsiao-Ping Liang, Kaushiong (TW); Kun-Yi Lee, Taipei (TW)

(73) Assignee: China Institute of Technology, Taipei (TW)

( * ) Notice: Subject to any disclaimer, the term of this patent is extended or adjusted under 35 U.S.C. 154(b) by 103 days.

(21) Appl. No.: 10/940,664

(22) Filed: Sep. 15, 2004

(65) Prior Publication Data

US 2006/0055865 A1 Mar. 16, 2006

(51) Int. Cl.
*G02F 1/13* (2006.01)
(52) U.S. Cl. .......................... 349/196; 349/201; 385/37; 359/318; 359/366
(58) Field of Classification Search ................ 349/196, 349/200, 201; 359/318, 366; 385/37
See application file for complete search history.

(56) References Cited

U.S. PATENT DOCUMENTS

| | | | | |
|---|---|---|---|---|
| 4,095,869 | A * | 6/1978 | Reichelt et al. | 349/201 |
| 4,251,137 | A * | 2/1981 | Knop et al. | 349/201 |
| 5,299,289 | A * | 3/1994 | Omae et al. | 349/201 |
| 5,467,204 | A * | 11/1995 | Hatano et al. | 358/482 |
| 5,496,670 | A * | 3/1996 | Hvilsted et al. | 430/56 |
| 6,014,197 | A * | 1/2000 | Hikmet | 349/201 |
| 6,215,928 | B1 * | 4/2001 | Friesem et al. | 385/37 |
| 6,271,966 | B1 * | 8/2001 | Tanabe et al. | 359/566 |
| 6,522,382 | B1 * | 2/2003 | Rudin | 349/143 |
| 6,999,156 | B2 * | 2/2006 | Chou et al. | 349/196 |

* cited by examiner

*Primary Examiner*—Andrew Schechter
*Assistant Examiner*—Nathanael Briggs
(74) *Attorney, Agent, or Firm*—Rosenberg, Klein & Lee

(57) ABSTRACT

The present invention discloses a tunable optical integrated element using liquid crystal as an active layer, which is applied to filters, couplers or optical add/drop multiplexer. The present invention includes a layer of liquid crystal as an active layer, a first waveguide with grating and a second waveguide, an isolation layer, a pair of electrodes. By applying the external voltage to control the direction of the liquid crystal, the refractive index of the waveguide changes in accordance with the modulation of the electric field. Thus invention has the features of simple structure, easy assembling, lower cost and integrating ability.

10 Claims, 5 Drawing Sheets

TUNABLE OPTICAL INTEGRATED ELEMENT USING LIQUID CRYSTAL AS ACTIVE LAYER

FIELD OF THE INVENTION

The present invention relates to a tunable optical integrated element, especially to a tunable optical integrated element using liquid crystal as active layer, which is applied to filters, couplers or optical add/drop multiplexers. The present invention includes a layer of liquid crystal as an active layer, a first waveguide with grating and a second waveguide, an isolation layer, and a pair of electrodes. By applying the external voltage to control the direction of the liquid crystal, the refractive index of the waveguide changes in accordance with the modulation of the electric field.

BACKGROUND OF THE INVENTION

Optical Add-Drop Multiplexers (OADM) is an essential component of the Dense Wavelength Division Multiplexer (DWDM) for applying on the node of internet and adding/dropping the wavelength so as to simplify the networks.

The increasing sophistication of a rapid expansion of network users demands for very high-speed networks with higher bandwidth and higher speed of router. Through the introducing diversity of service in network, the network shall have higher elastic scheduling. The new generation of network not only has higher transmission speed, longer transmission distance, but also capacity for various signals and dynamic bandwidth configuration. Based on such concept, in combination with DWDM (dense wavelength division multiplexing), tunable technology, and integrated technology, a reliable, stable network is provided. In order to deal with the increased number of wavelength on each optic fiber of the DWDM, the design of the OADM is getting complicated for enlarging the bandwidth. Therefore, the demand and practicability of tunable OADM is higher day after day.

So far, a lot of technology related to Optical Add/Drop Multiplexer has been published such as the optical add/drop multiplexer composed by the AWG (Arrayed waveguide and grating) and optical switch, bragg grating-assisted Mach-Zehnder Interferometer-based OADM made of or Mach-Zehnder Interferometer and fiber grating (refer to the paper: T. Erdogan, T. A. Strasser, M. A. Milbrodt, E. J. Laskowski, C. H. Henry, G. E. Kohnke, "Integrated-optical Mach-Zehnder add-drop filter fabricated by a using UV-induced grating exposure," Appl. Opt., Vol. 36, pp. 7838–7845, 1997), or Acoustic-Optic Tunable Filter OADM, Fiber Bragg grating OADM (refer to the paper: A. S. Kewitsch, G. A. Rakuljic, P. A. Willems, and A. Yariv, "All-fiber zero-insertion-loss add-drop filter for wavelength-division multiplexing," Opt. Lett., Vol. 23, No. 2, pp. 106–108, January 1998). The tunable OADM (refer to the paper: P. Tang, O. Eknoyan, and H. F. Taylor, "Rapidly tunable optical add-drop multiplexer (OADM) using a static-strain-induced grating in LiNbO3," J. Lightwave Technol., Vol. 21, No. 1, January 2003.) available on the market today is composed of various components and circulator thus the structure is complicated, the volume of the module or system is quite large and the cost is high. The fiber grating OADM uses the elasticity or temperature change to tune the period of fiber grating while the adjust time is long and the modulation speed is slow. The Acoustic-Optic Tunable Filter (AOTF) has low sensitivity to polarization. Although electro-optical tunable filter (EOTF) can improve the sensitivity problem of AOTF, both of them have the problem of broad bandwidth and wavelength that is difficult to overcome.

SUMMARY OF THE INVENTION

It is therefore a primary object of the present invention to provide a tunable optical integrated element with features of simple structure, easy assembling, low cost, integrating ability, which is applied to filters, couplers, and optical add/drop multiplexers, etc. The invention consists of a substrate with liquid crystal as the active layer thereabove, a first waveguide and a second waveguide, one or both with grating, disposed in ridge structure extending through the liquid crystal layer, a layer of cladding in combination with the substrate layer for clipping the liquid crystal layer and a pair of electrodes connected with power source for applying voltage to control the direction of liquid crystal and change the waveguide index in accordance with the electric field.

DETAILED DESCRIPTION OF THE PREFERRED EMBODIMENT

Figure 1:
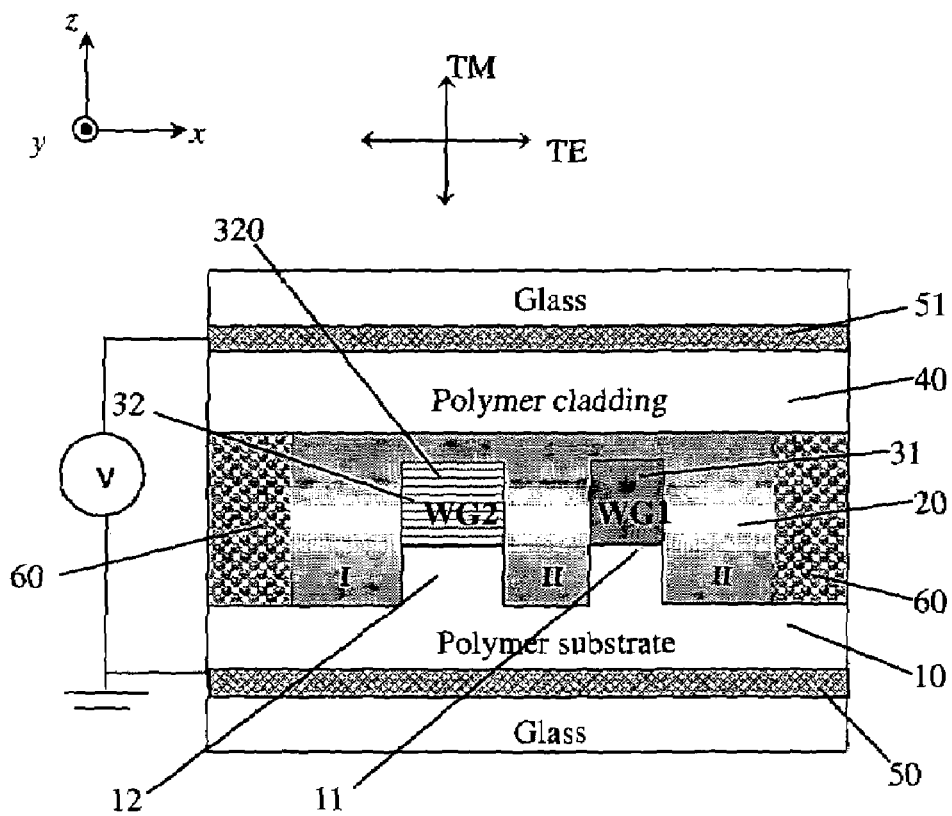
FIG. 1 is a cross-sectional view of the present invention.
Figure 2:
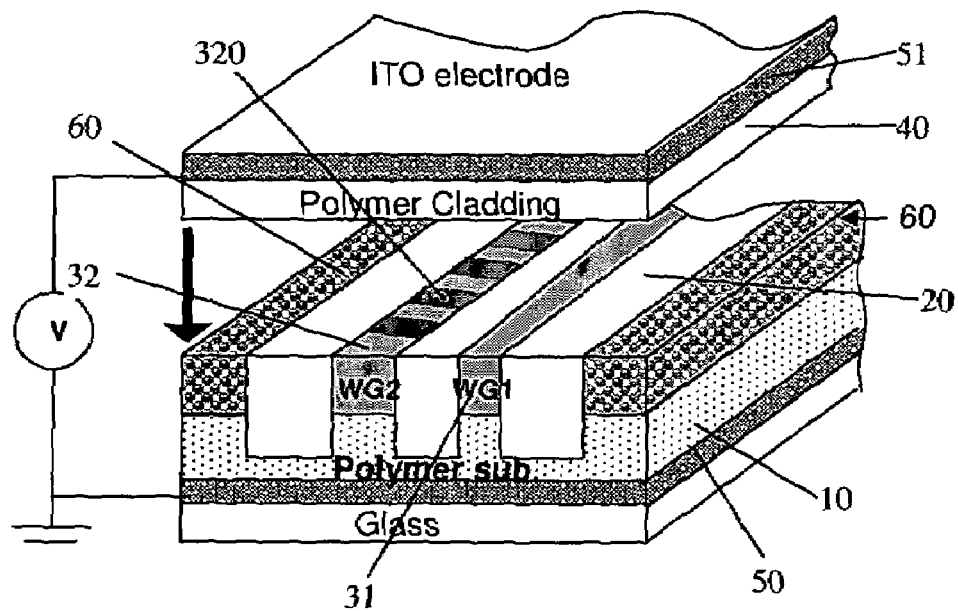
FIG. 2 shows a schematic drawing of cross-sectional view of an embodiment in accordance with the present invention.

Refer to the FIG. 1, the present invention discloses a tunable optical integrated element with liquid crystal, which is applied to filters, couplers or optical add/drop multiplexers, mainly includes a substrate (10), a layer of liquid crystal as an active layer for modulation, a waveguide set having a second waveguide (32) with grating (320) and a first waveguide (31), both extending and penetrating the liquid crystal layer (20) in ridge structure; an isolation layer (40) together with the substrate (10) to sandwich the liquid crystal layer (20), and a pair of electrodes (50) (51) connected with power for applying voltage, one (50) of the electrodes (50) (51) is arranged on the bottom of the substrate (10) while the other (51) is disposed on top of the isolation layer (40).

In an embodiment of the present invention, wherein two ridges (11) (12) formed on the top of the substrate (10), and each of the waveguides (31) (32) sticking along with each of the ridges (11) (12) of the substrate (10).

In an embodiment of the present invention, the first waveguide (31) also has grating (310).

In a preferred embodiment of the present invention, a spacer (60) is arranged outside liquid crystal layer (20).

In a preferred embodiment of the present invention, the substrate (10), the isolation layer (40), the second waveguide (32), and the first waveguide (31) are made of semiconductor, inorganic crystal, quartz, metal, glass, dielectric material or polymer material such as Poly-methylmethacrylate (PMMA).

In a preferred embodiment of the present invention, the electrodes (50) (51) are made of material that can form electrode such as indium tin oxide (ITO glass).

Referring to the table 1, it shows design parameters of a preferred embodiment of the present invention. The thickness of the substrate (10) is 15 μm while the refractive index thereof is 1.49. The thickness of the first waveguide (31) is 4 μm, the width thereof is 5 μm and the refractive index thereof is 1.52. The thickness of the second waveguide (32) is 4 μm with the width of 3 μm, while the refractive index thereof is 1.51 and the index modulation is 5.5×10$^{-3}$. The thickness of the isolation layer (40) is 10 μm with the refractive index of 1.3.

Figure 7:
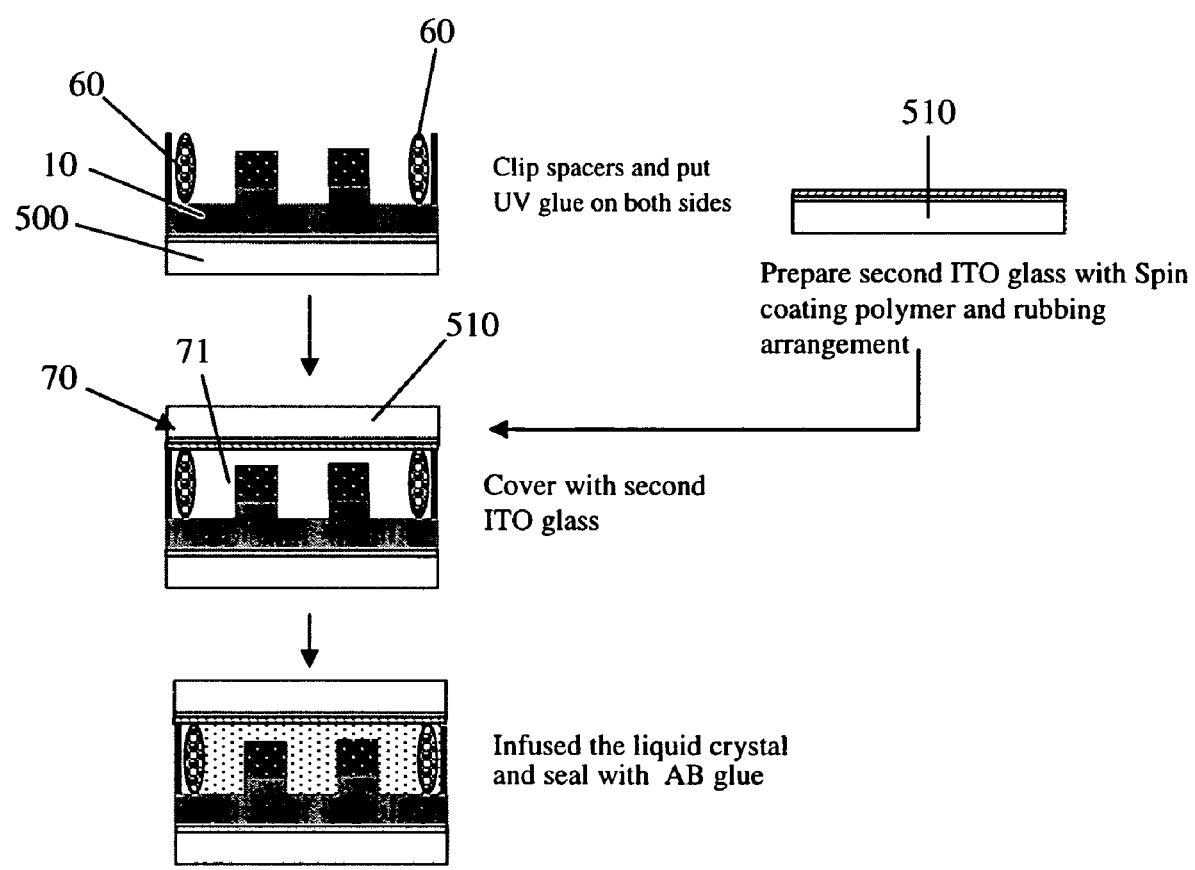
FIG. 7 shows the second stage of manufacturing process of an embodiment of the present invention.

Referring to FIG. 7 & FIG. 8, both show the manufacturing process of an embodiment of the present invention. A first ITO glass (500) is coated with first polymer and second polymer to be the substrate, then coating with PR (photoresist) on the second polymer, exposing through the UV light and developing the shape of waveguides, reactive ion etching (RIE) to form two ridges (11) (12) on the substrate (10) and two waveguides (31) (32) sticking along with the ridges (11) (12) of the substrate (10), exposing through the UV light to produce the grating pattern on the waveguide (32), clipping spacers (60) and putting UV glue on the both sides of the substrate (10). Prepare a second ITO glass with spin coating polymer to be the isolation layer (40) and rubbing arrangement, then covering the second ITO glass (510) on the top of the waveguides (31) (32) to form a clad (70), infused the liquid crystal in the space (71) of the clad (70), and sealed with AB glue. In this way, the integrated optical element in accordance with the invention is formed.

The theory of the present invention varies according to the shape, symmetry and the position of grating of the second waveguide (31) and the first waveguide (32). In analysis of the Gration Coupler, the present invention takes the waveguide theory of D. Marcuse—couple mode theory—that is more precisely. And in our design, we only consider forward mode and backward mode of the coupler with a single transverse-electric.

The whole Light-Field $E_y(x, z, t)$ can be developed as following:

$$E_y(x,z,t) = \sum_\mu [A_\mu(z)\exp(i\beta_\mu z) + B_\mu(z)\exp(-i\beta_\mu z)]e_{y\mu}(x)\exp(-i\omega t) \quad (4.1)$$

wherein, $A_\mu$ is the amplitude of the forward transmission mode, $B_\mu$ is the amplitude of backward transmission mode, $\beta_\mu$ is Propagation Constant transmission, and it is generally represented by $\beta = kn_{eff}$, $\omega$ is angular frequency, $$k = \frac{2\pi}{\lambda},$$

$e_{y\mu}(x)$ is describing the variation of transverse axis of the $\mu^{th}$ waveguide.

Figure 3:
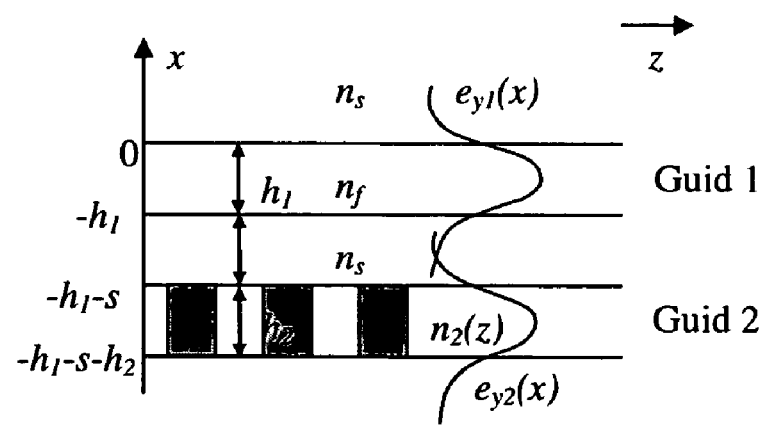
FIG. 3 shows a schematic drawing of a mode of an embodiment in accordance with the present invention.

The design of the present invention only takes forward and backward modes while the coupler is in a single transverse-electric (TE) field. The FIG. 3 shows the distribution of single mode waveguide and grating waveguide.

We can calculate the overshoot function and following equations to get the equivalent Refraction Index $n_{eff}$ of the $\mu^{th}$ waveguide.

$$k_{f\mu}h_\mu - 2\phi_{s\mu} = \nu\pi \quad (4.2)$$

wherein $h_\mu$ is the thickness of waveguide, $\nu$ is the integer degree of the modes, The number of waves $k_{f\mu} = k\sqrt{n_f^2 - n_{eff\mu}^2}$, Phase $\phi_{s\mu} = \tan^{-1}(\gamma_{s\mu}/k_{f\mu})$, $\gamma_{s\mu}$ is the decay rate of the light in transverse axis after entering the substrate, and $\gamma_{s\mu} = k\sqrt{n_{eff}^2 - n_s^2}$.

After getting the above-mentioned parameters, we can calculate the distribution of field of single mode of the waveguide and the grating waveguide.

As to the first waveguide, the Electric-Field of the first waveguide without grating is calculated as follows:

$$e_{y1}(x) = E_{f1}\begin{cases} \cos(k_{f1}h_1 - \phi_{s1})\exp(-\gamma_{s1}x) & x > 0 \\ \cos[k_{f1}(x+h_1) - \phi_{s1}] & -h_1 \leq x \leq 0 \\ \cos(\phi_{s1})\exp[\gamma_{s1}(x+h_1)] & x \leq -h_1 \end{cases} \quad (4.3)$$

As to the second waveguide, the Electric-Field of the second waveguide has grating is calculated as follows:

$$e_{y2}(x) = E_{f2} \quad (4.4)$$

$$\begin{cases} \cos(k_{f2}h_2 - \phi_{s2})\exp[-\gamma_{s2}(x+h_1+s)], & x > -(h_1+s) \\ \cos[k_{f2}(x+h_1+s+h_2) - \phi_{s2}], & -(h_1+s+h_2) \leq x \leq -(h_1+s) \\ \cos(\phi_{s2})\exp[\gamma_{s2}(x+h_1+s+h_2)], & x < -(h_1+s+h_2) \end{cases}$$

wherein, $E_{f\mu}$ is the amplitude. For getting distribution of modes after normalized, we let the condition as followings:

$$E_{f\mu} = \sqrt{\frac{4Z_0}{n_{eff\mu} h_{eff\mu}}}$$

$Z_0$ is the intrinsic impedance in vacuum, and $Z_0 \approx 377\Omega$ $h_{eff\mu}$ is the effective length, and $h_{eff\mu} = h_\mu + 2/\gamma_{s\mu}$ The light field transmitted inside the first waveguide and the second waveguide is composed of a forward mode and a backward mode, wherein the second waveguide has the periodic index grating thus the backward coupling should be considered while the first waveguide shall not. The couple-wave equations of the coupler are shown as follows:

$$\frac{dA_1}{dz} = iK_{11}A_1 + iK_{21}\exp[i(\beta_2-\beta_1)z]A_2 + iK_{11}\exp(-i2\beta_1 z)B_1 + iK_{21}\exp[-i(\beta_2+\beta_1)z]B_2 \quad (4.5)$$

$$\frac{dA_2}{dz} = iK_{12}\exp[i(\beta_1-\beta_2)z]A_1 + iK_{22}A_2 + iK_{12}\exp[-i(\beta_1+\beta_2)z]B_1 + iK_{12}\exp(-i2\beta_2 z)B_2$$

$$\frac{dB_1}{dz} = -iK_{11}\exp(i2\beta_1 z)A_1 - iK_{21}\exp[i(\beta_2+\beta_1)z]A_2 - iK_{11}B_1 - iK_{21}\exp[-i(\beta_2-\beta_1)z]B_2$$

$$\frac{dB_2}{dz} = -iK_{12}\exp[i(\beta_1+\beta_2)z]A_1 - iK_{22}\exp(i2\beta_2 z)A_2 - iK_{12}\exp[-i(\beta_1-\beta_2)z]B_1 - iK_{22}B_2$$

Wherein, the initial assumption $A_1(0)=1$; $A_2(0)=0$; $B_1(L)=0$; $B_2(L)=0$, and L is the length. $\beta_1$ is the transmission constant of the waveguide without grating. $\beta_2$ is the transmission constant of the waveguide having grating. $A_1$ is the amplitude of the forward transmission mode of the waveguide without grating. $B_1$ is the amplitude of the backward transmission mode of the waveguide without grating. $A_2$ is the amplitude of the forward transmission mode of the waveguide having grating. $B_2$ is the amplitude of the backward transmission mode of the waveguide having grating. $K_{11}$ is the couple coefficient of waveguide without grating coupled by the forward transmission mode and backward transmission mode. $K_{12}$ is the couple coefficient of the waveguide having grating disturbed by the couple from the transmission mode of waveguide without grating to the transmission mode of waveguide with grating. $K_{21}$ is the couple coefficient of the waveguide without grating disturbed by the couple from the transmission mode of waveguide having grating to the transmission mode of waveguide without grating. $K_{22}$ is the couple coefficient of waveguide having grating coupled by the forward transmission mode and backward transmission mode.

Figure 5:
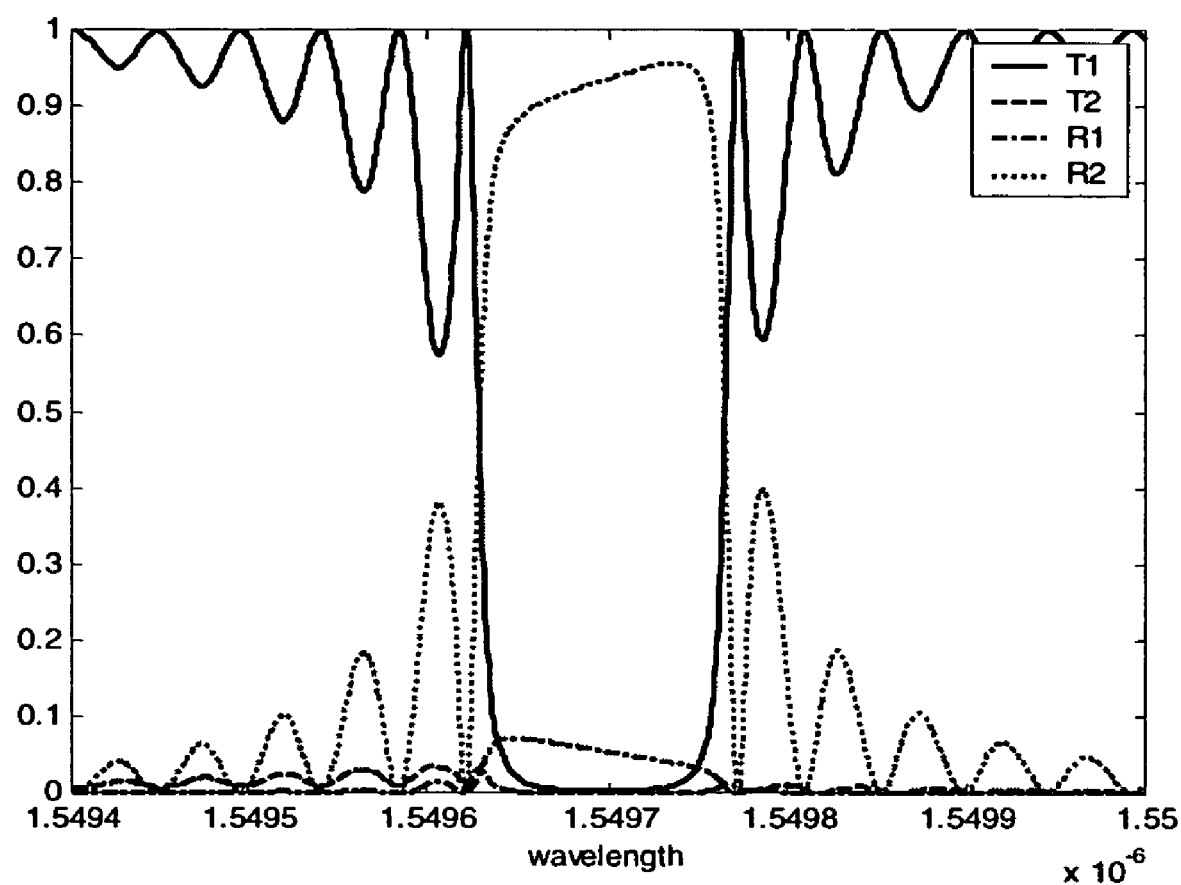
FIG. 5 is the output spectrum of an embodiment of the present invention while the index of the liquid crystal layer is 1.49.

Referring to FIG. 5, L is the length of waveguide and the initial assumption is $A_1(0)=1$; $A_2(0)=0$; $B_1(L)=0$; $B_2(L)=0$. Modes $v$ and $\mu$ represent the modes of the second waveguide (32) and the first waveguide (31) respectively. The evanescent fields of these transmission modes are overlapping and interacted each other, and then result in couple. The relative coefficient of the couple phenomenon is $K_{v\mu}$, and the coupling coefficient $K_{v\mu}$ is related to perturbations $\Delta\epsilon_{v\mu}$. The mathematical equations are as followings:

$$K_{v\mu}(z) = \frac{\omega}{4} \int_{-x}^{x} \Delta\varepsilon_{v\mu}(x,z) e_{yv}(x) e_{y\mu}^*(x) dx \qquad (4.6)$$

$$\Delta\varepsilon_{11}(x,z) = \begin{cases} \varepsilon_0(n_2^2(z) - n_s^2) & -(h_1 + s + h_2) \leq x \leq -(h_1 + s) \\ 0 & \text{other} \end{cases} \qquad (4.7)$$

$$\Delta\varepsilon_{22}(x,z) = \begin{cases} \varepsilon_0(n_2^2(z) - n_f^2) & -(h_1 + s + h_2) \leq x \leq -(h_1 + s) \\ \varepsilon_0(n_f^2 - n_s^2) & -h_1 \leq x \leq 0 \\ 0 & \text{other} \end{cases} \qquad (4.8)$$

By using the method of effective refractive index, only a little difference—0.122% was found between the result of the index from 2D and 3D simulation of the propagation of light beam. Thus all the simulation takes the 2 dimension one. For more precisely result, the simulated length of the spectroscope shall multiply by a coefficient of 1.0012207.

By applying an external electric field, the liquid crystal is easy to be polarized and orients. In the present invention, the change of the liquid crystal index from the orientation results in the refractive index change of the coupler waveguide and thus a tunable spectrum of the device.

Figure 4:
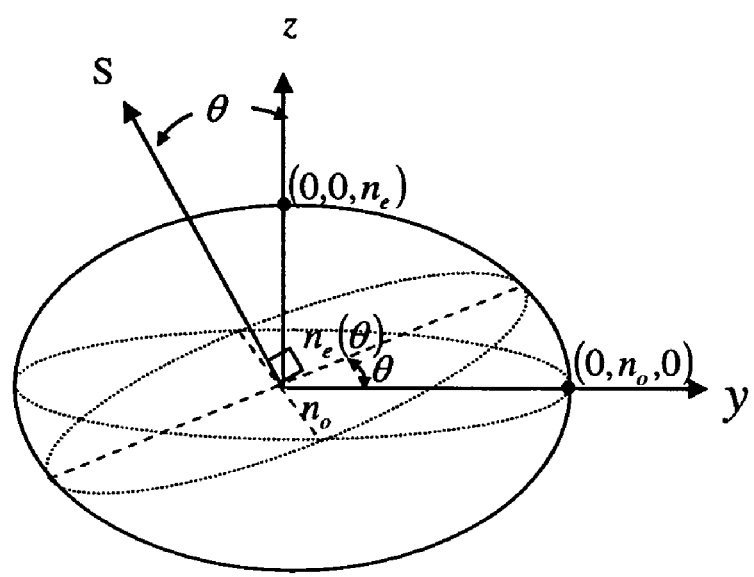
FIG. 4 is a schematic drawing of elliptic-spherical refractive index in accordance with the present invention.

FIG. 4 is a schematic drawing of elliptic-spherical refractive index of the negative-tone uniaxial crystal.

By applying an external electric field, the LC molecules rotate at an angle $\theta$, s is the direction of the incident light and the refractive index is:

$$n_e(\theta) = \frac{n_e n_0}{\sqrt{n_e^2 \cos^2\theta + n_o^2 \sin^2\theta}}$$

where $n_o$ and $n_e$ are the refractive indices of the LCs to the ordinary ray and the extraordinary ray respectively.

Refer to FIG. 5, it shows the operation of an embodiment in accordance with the present invention, the Design Parameters is shown in Table 1.

TABLE 1

Design Parameters of the tunable OADM

| | |
|---|---|
| Cladding | Thickness 10 μm/Refractive index ($n_c$) 1.3 |
| Substrate | thickness 15 μm/Refractive index ($n_s$) 1.49 |
| Waveguide 1 | thickness (t) 4 μm/Width (w1) 3 μm/Refractive index($n_{f1}$) 1.51 |
| Waveguide 2 | thickness (t) 4 μm/Width (w2) 5 μm/Refractive index($n_{f2}$)1.52 Index modulation 5.5 × $10^{-3}$ |
| Coupler | distance (S) 4 μm/Length (L) 15 mm/grating period($\Lambda$)0.516 μm |

Figure 6:
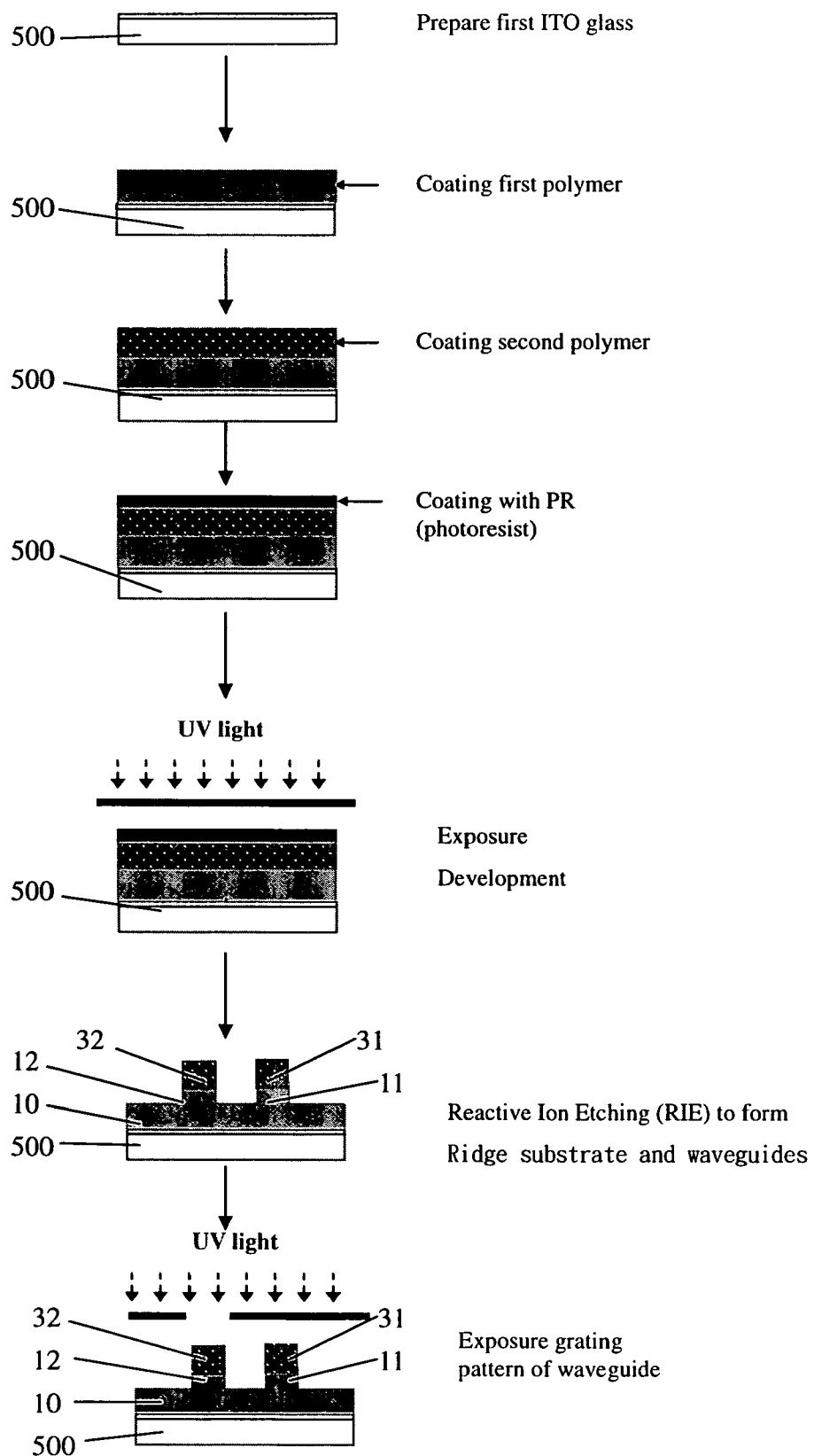
FIG. 6 shows the first stage of manufacturing process of an embodiment of the present invention.

Refer to Table 1, when the light passes through the un-grated first waveguide with length L, the forward propagating intensity T1 is $2.678 \times 10^{-3}$, T2 is $9.2569 \times 10^{-5}$ while the backward intensity R1 is $5.1598 \times 10^{-2}$ and R2 is $9.4562 \times 10^{-1}$. Without applying voltage, the refractive index of liquid crystal layer is 1.485. FIG. 6 shows the spectrum for the index of LCs. The peak drop reflection R2-0.9471 occurs at the wavelength of 1549.15 nm of the second waveguide (32). The tuning range of the index is about 1.485–1.497 and the channel bandwidth is 32.5±8 GHz. The tuning range of the wavelength towards the optimum add/drop operation of the present invention is 1549.15~1551.15 nm (250 GHz).

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A tunable optical integrated element with liquid crystal capable of applying to filters, couplers or optical add/drop multiplexers comprising:
   a substrate;
   a layer of liquid crystal formed on the first side of the substrate as an active layer for modulation;
   a waveguide set having a second waveguide having grating and a first waveguide, both penetrating and extending the liquid crystal layer in ridge structure;
   an isolation layer in combination with the substrate layer for sandwiching the liquid crystal layer; and
   a pair of electrodes connected with power source for applying voltage, the electrodes serving as first cladding layer for the liquid crystal layer, the isolation layer and the substrate;
   wherein the thickness of the substrate is 15 μm with the refractive index of 1.49, the thickness of the first waveguide is 4 μm while the refractive index is 1.52 and the index modulation is $5.5 \times 10^{-3}$; the thickness of the second waveguide is 4 μm, the width thereof is 3 μm and the refractive index is 1.51; the thickness of the isolation layer is 10 μm with the refractive index of 1.3.

2. The tunable optical integrated element with liquid crystal as claimed in claim 1, wherein two ridges formed on the top of the substrate, and each of the waveguides sticking along with each of the ridges of the substrate.

3. The tunable optical integrated element with liquid crystal as claimed in claim 1, wherein the first waveguide has grating.

4. The tunable optical integrated element with liquid crystal as claimed in claim 1, wherein one of the electrodes is arranged on the bottom of the substrate while the other is disposed on top of the isolation layer.

5. The tunable optical integrated element with liquid crystal as claimed in claim 1, wherein a plurality of spacer is arranged outside the isolation layer.

6. The tunable optical integrated element with liquid crystal as claimed in claim 1, wherein the substrate is glass.

7. The tunable optical integrated element with liquid crystal as claimed in claim 1, wherein the first waveguide and the second waveguide are made of semiconductor.

8. The tunable optical integrated element with liquid crystal as claimed in claim 1, wherein the first waveguide and the second waveguide are made of OG series polymer material.

9. The tunable optical integrated element with liquid crystal as claimed in claim 1, wherein the isolation layer is made of dielectric material.

10. The tunable optical integrated element with liquid crystal as claimed in claim 1, wherein the isolation layer is made of OG series polymer material.

* * * * *